March 11, 1969
J. E. JOHANSON
3,432,734
ENCLOSED ADJUSTABLE CAPACITOR WITH SEALS FOR OPERATING ROD
Filed Jan. 9, 1967
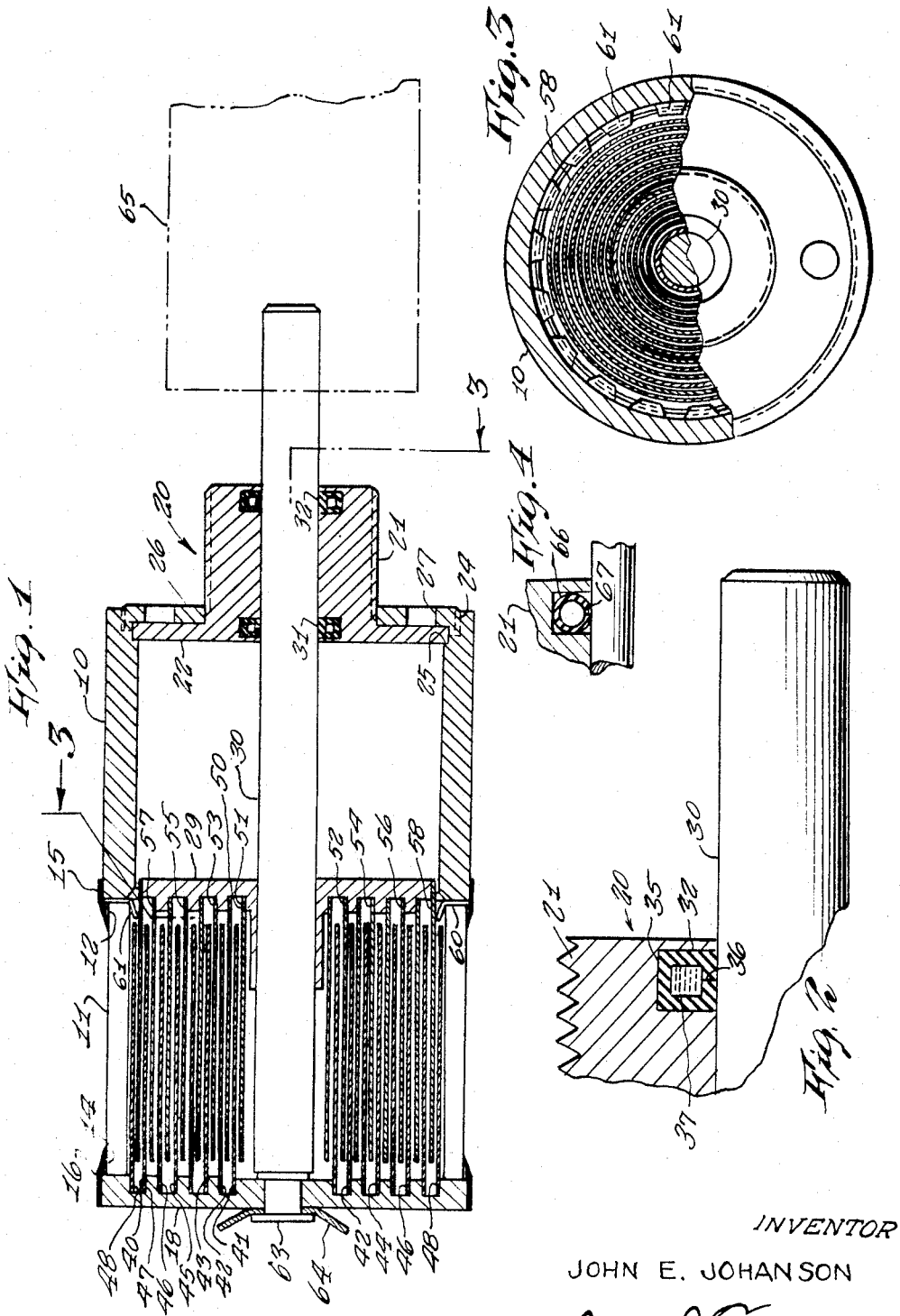
INVENTOR
JOHN E. JOHANSON
BY James J. Cannon.
ATTORNEY 3,432,734
ENCLOSED ADJUSTABLE CAPACITOR WITH
SEALS FOR OPERATING ROD
John E. Johanson, P.O. Box 329, Boonton, N.J. 07005
Filed Jan. 9, 1967, Ser. No. 607,999
U.S. Cl. 317—245                               4 Claims
Int Cl. H01g 5/02

ABSTRACT OF THE DISCLOSURE

An adjustable capacitor with interleaved cylindrical electrodes one set of which is stationary. The other set of electrodes is supported by an axially displaceable rod. Both sets of electrodes are enclosed within a housing. Sealing rings engage the lateral surface of the rod where it passes through an end rod guiding portion of the housing. The sealing rings are of hollow generally toroidal configuration and have a circumferential slit the edges of which engage the rod. Each ring contains a supply of lubricant which lubricates the rod and seals the capacitor against the entry of dust and moisture.

---

The present invention relates to electrical capacitors and more particularly to enclosed adjustable capacitors which are provided with sealing rings for the operating rod whereby dust and moisture are excluded from the interior of the capacitor and lubrication is provided for the operating rod.

The invention will be described in detail in the following specification with reference to the accompanying drawing forming a part hereof.

Referring to the drawing:

FIGURE 1 is an elevational view in axial section showing an adjustable capacitor embodying the invention.

FIGURE 2 is an enlarged fragmentary sectional view illustrating one of the sealing rings.

FIGURE 3 is an end view, partly broken away and shown in section on the line 3—3 of FIG. 1.

FIGURE 4 is a fragmentary sectional view showing a modified form of sealing ring.

The capacitor shown in the drawing comprises a cylindrical metal body portion 10 in axial alignment with a cylindrical insulator body portion 11 formed of alumina, glass or similar low loss insulating material. The ends of the insulator body portion 11 are metalized to form annular metallic bands 12 and 14. The band 12 is connected by a ring 15 of hard solder to the metal body portion 10. The metallic band 14 is connected by a ring 16 of hard solder to an end plate 18 of the capacitor.

A guide member designated generally as 20 is located in the free end of body portion 10. The guide member 20 comprises an exteriorly threaded neck portion 21 which is useful for mounting the capacitor and a flange portion 22 formed integrally with the neck portion 21. The free end of the body portion 10 is interiorly threaded at 24. A precisely dimensioned shoulder 25 is formed adjacent to the threads 24 and the flange portion 22 of guide member 20 is accurately located against the shoulder 25. A flat circular nut 26 is in threaded engagement with the threads 24 and holds the flange portion 22 in engagement with the shoulder 25. The nut 26 has diametrically opposed circular apertures 27 formed therein for engagement by the cooperating members of a spanner wrench (not shown).

An electrode supporting member 29 is mounted on an adjustment rod member 30 being cemented or otherwise suitably secured thereto for displacement therewith. The rod 30 is formed of alumina or other suitable low loss insulating material. The rod member 30 is freely longitudinally slidable in the neck portion 21 of guide member 20.

Adjacent to its inner and outer ends, the neck portion 21 has annular grooves 31 and 32, respectively, formed therein. Each of the grooves 31 and 32 contains an annular sealing ring 35. As shown in FIGS. 1 and 2, the sealing ring 35 is formed of a suitable resilient material such as silicone rubber and has a generally rectangular cross-sectional configuration in radial section. In FIGS. 1 and 2, each ring 35 is snugly received in its respective groove 31 or 32. As shown in FIG. 2, the ring 35 is of generally square cross-sectional shape and of uniform wall thickness. Midway of its surface which engages the rod 30, there is a circumferential slit 36 which provides communication between the interior of the hollow ring 35 and the surface of the rod 30. A supply of silicone oil 37 is confined within the ring 35. The oil 37 passes gradually through the slit 36 to the surface of the rod 30 which is maintained lubricated thereby. Axial movement of the rod 30 through the ring 35 increases the flow of oil 37 with respect to the inherent capillary flow when the rod 30 is stationary. The rings 35 thus seal the interior of the housing 10, 11 against the entry of dust and moisture. Additionally, the rings 35 maintain the rod 30 properly lubricated for sliding in the guide member 20.

The inner face of the end plate 18 has a series of four concentric annular grooves 40 formed therein. A series of eight concentric cylindrical stator electrodes 41–48 is mounted on the grooves 40, adjacent ones of the electrodes, such as 41 and 42, being in engagement with opposite sides of the same groove 40. The electrodes 41–48 are fixedly secured in their respective grooves by brazing, soldering on other suitable means.

The movable electrode support 29 has a series of four concentric annular grooves 50 formed on its face which is directed toward the stationary electrodes 41–48. Fixedly disposed in the grooves 50 are eight movable cylindrical electrodes 51–58 which are interleaved between the stationary electrodes 41–48. Contact with the movable electrodes is maintained by a ring member 60 having contact fingers 61 which press resiliently against the outermost movable electrode 58. The ring member 60 is secured between the insulating housing portion 11 and the metal housing portion 10 by the ring 15 of hard solder.

A stop member 63 is located at the center of end plate 18 and serves to limit leftward travel of the rod 30 to the position of maximum capacitance shown in FIG. 1. The stop member 63 also serves to mount a soldering terminal 64 for establishing electrical connection with the stator plates 41–48. Connection with movable plates 51–58 is ordinarily made by the threaded neck portion 21 of guide member 20.

The rod 30 is reciprocated longitudinally to vary the capacitance of the capacitor by drive means 65 which may be a knob for manual manipulation or may be a servomotor for remote control.

FIGURE 4 shows a modified form of sealing ring wherein the ring 66 is of circular cross-sectional configuration with a slit 67 which is similar in its operation to the slit 36 described above.

While I have shown and described what I believe to be the best embodiment of my invention, it will be apparent to those skilled in the art that various changes and modifications may be made therein without departing from the spirit and scope of the invention as defined in the appended claims.

What is claimed is:

1. An adjustable capacitor comprising: a set of stator electrodes; a set of movable electrodes cooperating with said stator electrodes to provide a capacitance therebetween which may be varied by displacement of said movable electrodes; air-tight housing means enclosing said electrodes, said housing means including a guide member having an aperture formed therein; a rod member extending movably through said aperture for guidance by said member, said rod member being connected to said movable electrodes for displacement thereof, said guide member having a recess formed surrounding said guide member; a hollow sealing member snugly fitted in said recess and continuously engaging the lateral surface of said rod member throughout the entire periphery thereof, said sealing member having a slit formed therein which provides communication between said lateral surface and the interior of said sealing member; and a quantity of sealing and lubricating liquid confined within said sealing member, said liquid emerging through said slit into contact with said lateral surface for lubricating said rod member during the course of its movement in said aperture and for excluding dust and moisture from the interior of said housing means.

2. A capacitor according to claim 1, wherein said rod member is of circular cross-sectional configuration and said sealing member is annular.

3. A capacitor according to claim 2, wherein said rod member is movable longitudinally through said aperture.

4. A capacitor according to claim 3, wherein said electrodes are cylindrical and said stator electrodes are coaxially interleaved between said movable electrodes, all of said electrodes being coaxial with said rod member.

References Cited

UNITED STATES PATENTS

| | | | |
|---|---|---|---|
| 2,776,154 | 1/1957 | Leistensnider | 277—226 X |
| 2,889,501 | 6/1959 | Wilkens | 317—245 |
| 3,055,670 | 8/1962 | Sampson | 277—226 X |
| 3,213,340 | 10/1965 | Robertson | 317—250 X |
| 3,242,397 | 3/1966 | Jennings | 317—245 |

FOREIGN PATENTS

| | | |
|---|---|---|
| 730,310 | 1/1953 | Great Britain. |

DARRELL L. CLAY, *Primary Examiner.*

E. A. GOLDBERG, *Assistant Examiner.*

U.S. Cl. X.R.

277—24.3; 317—250, 251